INVENTOR.
HAROLD MOREINES
BY
Herbert L. Davis
ATTORNEY b FUNCTIONAL ELEMENTS PER SYSTEM
m LEVEL REDUNDANCY
SINGLE – LEVEL VOTING a FUNCTIONAL ELEMENTS PER VOTING LEVEL
b FUNCTIONAL ELEMENTS PER SYSTEM
m LEVEL REDUNDANCY
n LEVEL VOTING INVENTOR.
HAROLD MOREINES
BY
Herbert L. Davis
ATTORNEY

LEGEND

CURVE $A_1$ - $m = 1, p_S = .98$

CURVE $A_3$ - $m = 3, p_S = .98$

CURVE $A_5$ $m = 5, p_S = .98$

CURVE $B_1$ - $m = 1, p_S = .95$

CURVE $B_3$ - $m = 3, p_S = .95$

CURVE $B_5$ - $m = 5, p_S = .95$

CURVE $C_1$ - $m = 1, p_S = .92$

CURVE $C_3$ - $m = 3, p_S = .92$

CURVE $C_5$ - $m = 5, p_S = .92$

INVENTOR.
HAROLD MOREINES
BY Herbert L. Davis
ATTORNEY

INVENTOR.
HAROLD MOREINES
BY Herbert L. Harris
ATTORNEY

INVENTOR.
HAROLD MOREINES
BY Herbert L. Davis
ATTORNEY

United States Patent Office 3,305,735

Patented Feb. 21, 1967

3,305,735

SIGNAL SELECTION AND MONITORING SYSTEM UTILIZING REDUNDANT VOTING CIRCUITS

Harold Moreines, Springfield, N.J., assignor to The Bendix Corporation, Teterboro, N.J., a corporation of Delaware Filed Oct. 7, 1963, Ser. No. 314,397
5 Claims. (Cl. 307—88.5)

This invention relates to signal selection and monitoring techniques in redundant computing and control systems and more particularly to the application of means for detecting the occurrence of failures and in allowing only a true signal to be transmitted.

The need for ultra-reliable flight control systems and in particular the necessity for fail-operative performance during critical phases of flight has dictated the use of the triple redundant system implementation. Such implementation heretofore has consisted basically of comparison monitoring, wherein redundant signals have been compared on an amplitude basis and upon detection of a failed signal, manifested by a comparison error greater than a preset limit, the faulty signal is disconnected from the line by active switching element. Such techniques have not proved entirely satisfactory as the failed signal must obtain a deviation equal to the preset limit before it is disconnected making it possible for a transient pulse equal to this limit to be transmitted. Also, if redundant channel separation is maintained throughout, the build up of signal tolerances through cascaded functional elements may become so large at the channel output points as to cause frequent nuisance disconnects or, in the alternative, to require that the tolerances on each functional element be extremely precise resulting in prohibitive cost.

In situations where the flight safety of high performance aircraft in critical flight conditions is dependent upon stability augmentation, redundancy is necessary to insure continued system operation in the presence of single faults. Such situations may arise, for example, in low-level, high speed tactical missions; in hovering and transitional flight of VITOL aircraft; or in the terminal phases of all-weather automatic landing.

Conventional flight control systems for stability augmentation are comprised of sensors, data processing elements, and actuators. This invention is concerned primarily with those portions of the system that generate, process, or operate from data in the form of electrical voltages or currents. The current state of the art in sensor and actuator mechanization is based almost completely upon analog data techniques. Until the technology of direct digital sensing and actuation reaches a greater degree of maturity and reliability than is presently exhibited, the simplest and most straightforward stability augmentaion system mechanization will employ analog data-processing.

Thus any redundancy technique applied to the basic flight control system must be compatible with the various forms of analog data generally encountered in these systems.

The redundant system of the present invention employs a form of majority logic voting in which the control channels are triplicated and divided into functional groupings having suitable data interfaces. Majority voters are inserted into the "on-line" control system at these points.

The voter is a simple, passive network which continuously selects and transmits a signal having an intermediate amplitude among three input signals, i.e. ignores hardovers, null failures, degraded signals. This is accomplished with no active switching of signals or interruption of the signal transmission lines.

At the same time, the signals are monitored on an "off-line" basis to provide the necessary logic to determine and store the occurrence of malfunctions. This is accomplished in a manner which in no way interferes with or interrupts the control channels, and in fact, the monitor malfunction indication may be adjusted for whatever level or signal degradation or failure is determined to be outside of system performance requirements. This ensures that, in the event of minor changes in component characteristics, nuisance disconnects or warnings do not occur even though the resultant signal is in fact being rejected by the voter circuit. However, should this degradation worsen either on a long term or short term basis, the monitor circuit will indicate the presence of a malfunction when the degradation exceeds specification levels.

The choice of voter-monitor locations within the system can provide, as an immediate by-product, line replaceable unit (LRU) malfunction isolation since the location of voter-monitor ensembles is best accomplished at the input-output terminals of replaceable assemblies. It is also possible to utilize these techniques within the LRU assemblies to provide fault isolation at the quick disconnect subassembly level to further reduce and simplify maintenance operations.

One object of this invention is to provide a redundancy technique that will eliminate the short-comings of previous systems and provide a capability for fail-operative performances without incurring excessive penalties in system weight, complexity, cost and maintainability.

Another object of the invention is to provide a novel circuit capable of selecting the true signal and transferring that signal only, essentially undistorted, to its output terminals.

The invention contemplates an intermediate amplitude selective gate circuit utilizing amplitude selection properties inherent in digital logic gates, in a combination of diode "AND" or "OR" gates arranged so as to select an intermediate amplitude signal from among a plurality of input signals and to transfer that signal essentially undistorted to its output terminal.

The foregoing and other objects and advantages of the invention will appear more fully hereinafter from a consideration of the detailed description which follows, taken together with the accompanying drawings wherein several embodiments of the invention are illustrated by way of example. It is to be understood, however, that the drawings are for the purpose of illustration only and are not to be construed as defining the limits of the invention.

Figure 1:
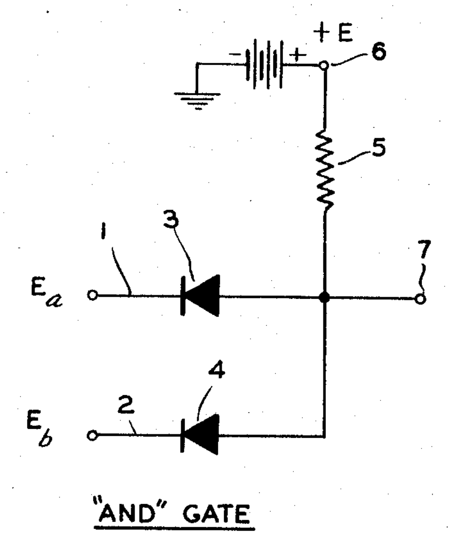
FIGURE 1 is a schematic drawing of a diode logic "AND" gate utilized in the invention.
Figure 2:
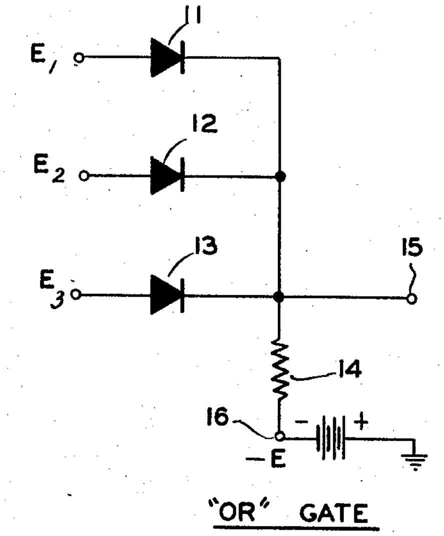
FIGURE 2 is a schematic drawing of a diode logic "OR" gate utilized in this invention.

Referring to the drawing of FIGURE 1, there is shown a conventional diode logic "AND" gate including two input diodes 3 and 4, a current limiting resistor 5 connected to a positive potential 6, and an output 7. The amplitude selective property of this circuit is such that if two signals $E_a$ and $E_b$ are applied to the inputs 1 and 2 respectfully, the output at 7 is equal to the most negative of the inputs. Referring now to the drawing of FIGURE 2 there is shown a conventional diode logic "OR" gate including three input diodes 11, 12, and 13 and a current limiting resistor 14 connected to a negative potential 16 and an output 15. The amplitude selective property of this circuit is such that if three signals E1, E2 and E3 are applied to the input diodes 11, 12, and 13, the output at point 15 would be equal to the most positive of the inputs. In both of these circuits these properties hold true on an instantaneous basis and hence may be applied to any synchronous time varying data such as suppressed-carrier modulated voltages, modulated D.C. voltages, amplitude modulated or width modulated pulses or binary modulated carrier as well as conventional digital data.

Figure 3:
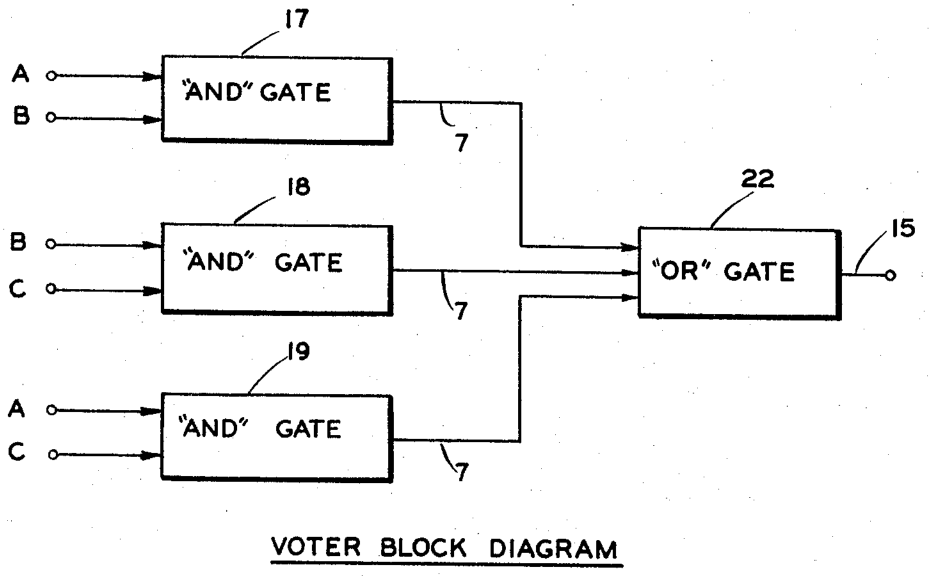
FIGURE 3 is a block diagram of a combination of "AND" and "OR" gate circuits in a voter device embodying the invention.
Figure 7:
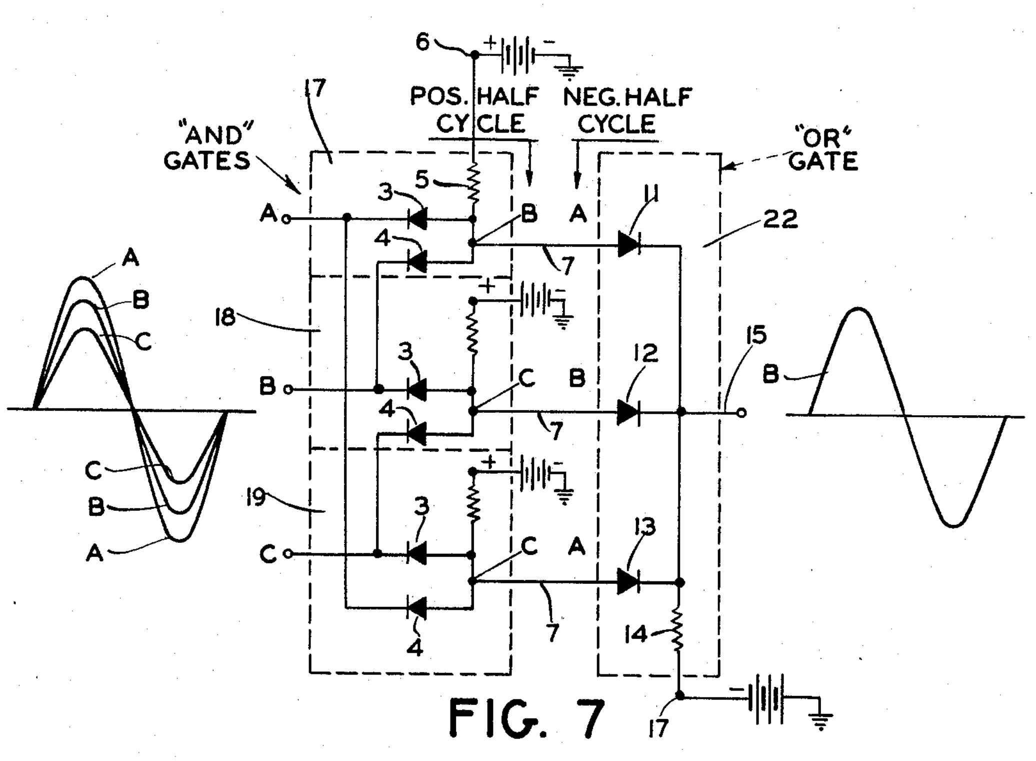
FIGURE 7 is a schematic wiring diagram of one form of voter device embodying the invention.

One embodiment of the invention as applied to a triple redundant system is illustrated in FIGURES 3 and 7. In FIGURE 3 a block diagram showing a combination of "AND" and "OR" circuits wherein three "AND" gates 17, 18, and 19 form three channels to compare signals of a triple redundant system. Alternating current signals A and B are applied to "AND" gate 17, alternating current signals B and C are applied to "AND" gate 18 and alternating current signals C and A are applied to "AND" gate 19. The more negative of each of these pairs of input signals is emitted at the output of each "AND" gate. These output signals are then applied to an "OR" gate 22 which selectively emits a signal equal to the most positive signal applied.

The wave forms of the alternating current input signals A, B, and C are illustrated graphically, by way of example, at the left of FIGURE 7 with the wave form of the intermediate amplitude alternating current output signal B being shown at the right of FIGURE 7.

Figure 8:
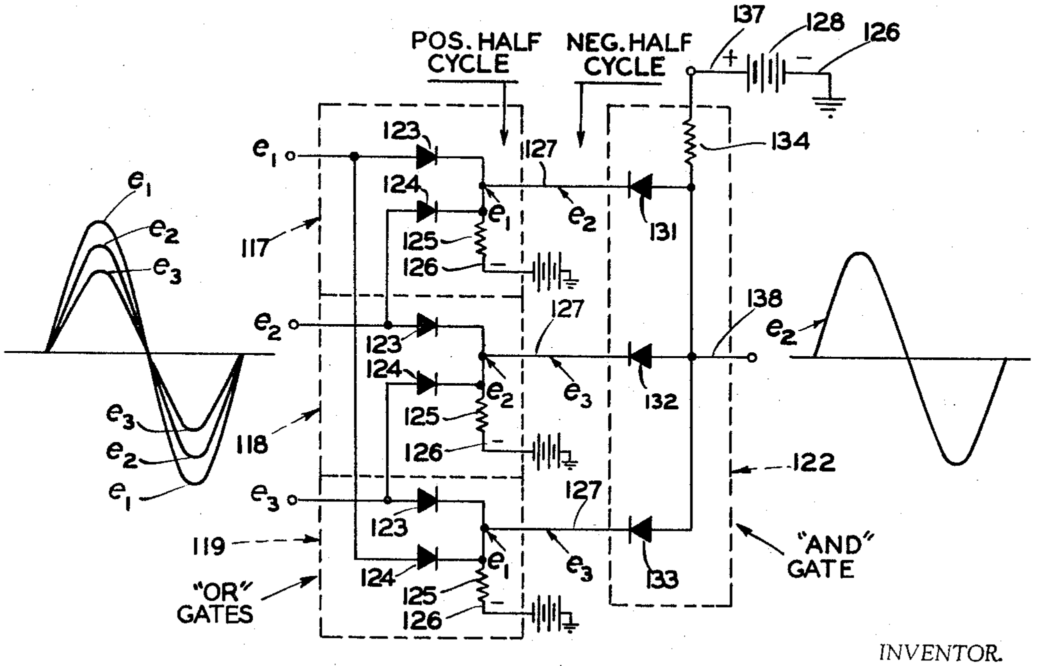
FIGURE 8 is a schematic wiring diagram of an alternate form of voter device embodying the invention.

An alternative form of a voter device embodying the invention, as applied to a triple redundant system is illustrated in FIGURE 8 showing a combination of "OR" and "AND" gate circuits wherein three "OR" gates 117, 118, and 119 form three channels to compare signals of a triple redundant system.

The outputs of "OR" gates 117, 118, and 119 are connected to the inputs of an "AND" gate 122 which selectively emits an alternating current signal equal to the most negative signal applied and resulting in an intermediate amplitude alternating current output signal $E_2$.

As shown in FIGURE 8, each of the "OR" gates 117, 118, and 119 includes two input diodes 123 and 124, a current limiting resistor 125 connected to a negative potential 126 of a source of direct current or battery 128. The amplitude selective property of the circuit is such that if two signals are applied to the inputs of the diodes 123 and 124, respectively, the output at 127 is essentially equal to the most positive of the inputs.

Referring to the drawing of FIGURE 8, there is operatively connected to the outputs 127 of the "OR" gates 117, 118, and 119 an "AND" gate 122 which includes three input diodes 131, 132, and 133 connected respectively to the output lines 127 from the "OR" gates 117, 118, and 119, respectively. There is further provided a current limiting resistor 134 connected at one end to a positive potential 137 from the battery 128 and at the opposite end by an output 138 leading from the outputs of the diodes 131, 132, and 133.

The amplitude selective property of the "AND" gate circuit 122 is such that if three signals are applied through the output lines 127 from the "OR" gates 117, 118, and 119 to the input diodes 131, 132, and 133, the output at the point 138 would be essentially equal to the most negative of the inputs. In both the circuit of the "OR" gates 117, 118, and 119 and the circuit of the "AND" gate 122, the properties of selecting respectively the most positive and the most negative of the applied inputs hold true on an instantaneous basis, and hence, may be applied to any synchronous time varying data such as suppressed-carrier modulated voltages, modulated D.C. voltages, amplitude modulated or width modulated pulses or binary modulated carrier as well as conventional digital data.

Thus, as shown in FIGURE 8, alternating current input signals $e_1$ and $e_2$ are applied to "OR" gate 117; alternating current input signals $e_2$ and $e_3$ are applied to "OR" gate 118, and alternating current input signals $e_1$ and $e_3$ are applied to "OR" gate 119.

The wave forms of these input signals are shown graphically, by way of example, at the left of FIGURE 8 and the more positive of each of these pairs of alternating current input signals is emitted at the output 127 of each "OR" gate. These output signals are then applied to an "AND" gate 122 which selectively emits an alternating current signal at the output line 138 equal to the most negative signal applied and resulting in an intermediate amplitude alternating current output signal $e_2$ which may have the wave form illustrated at the right of FIGURE 8.

In a sense the operation of the voter devices of FIGURES 7 and 8 may be considered to be a voting process since the selected signal is that which is most likely to be a good one, this conclusion having been arrived at by the following deductive reasoning. The good or a true signal must lie between a set of upper and lower bounds, the failed or false signal is one which is out of tolerance with these bounds and if no more than one failure has occurred then the false signal is either the most positive extreme or the most negative extreme signal since it is outside of the tolerance band. Hence, the intermediate amplitude signal is one of the two signals within the tolerance bounds and is therefore a true signal. Admittedly under some special conditions the fail signal may be momentarily intermediate in value; however, at these instants it will be within the tolerance bounds and thus by definition acceptable as a true signal.

By utilizing a number of these intermediate amplitude gates in various parts of a redundant system a significant reliability improvement may be attained, for failures may thus occur in various parts of the system without ill effect.

*Redundant system configuration*

Figure 4:
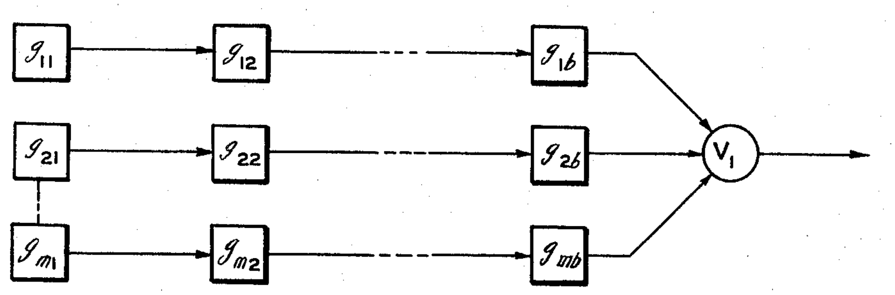
FIGURE 4 is a block diagram of a redundancy system of the order $(m, 1)$ and including a voter device $v_1$ embodying the invention.

In general, flight control equipment can be represented by a set of functional blocks cascaded between the input sensory devices and the output actuation devices. To apply redundancy, the entire system comprised of, say, *b* functional elements may be replicated *m* times (where *m* is odd) and the *m* output lines applied to a single majority-logic output voter. Such an array is shown in FIGURE 4.

It has been known that this form of majority logic redundancy cannot yield a system reliability improvement for arbitrarily unreliable functional elements. In fact the nonredundant system survival probability, $P_s$, must exceed 0.5 to effect an improvement.

Figure 5:
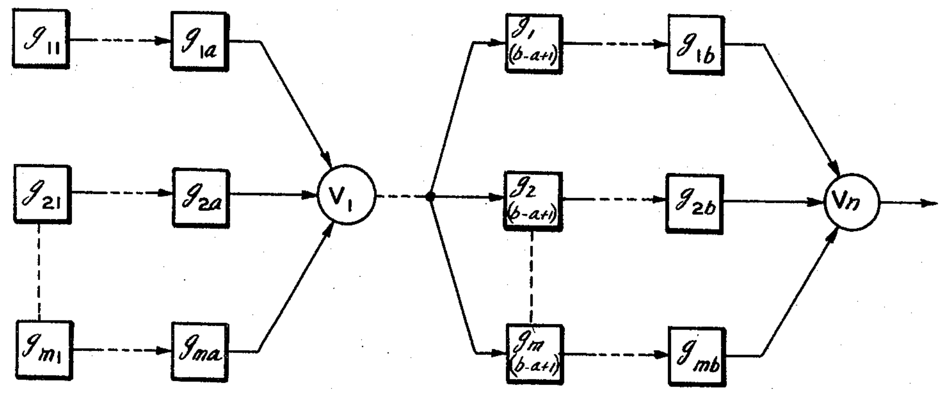
FIGURE 5 is a block diagram of a redundancy system of the order $(m, n)$ and including voter devices $v_1$ and $v_n$ embodying the invention.

However, another degree of freedom can be exercised in configuring the redundant system. By dividing the basic system into *n* voting levels with each voted subsystem having a complexity level, $a=b/n$ functional elements, it has also been shown that by increasing the number of voting levels without limit, an arbitrarily high reliability improvement can be achieved. Practically, however, only a small number of voting levels need be employed to provide a significant reliability improvement over that of the nonredundant system. A configuration of this type is shown in FIGURE 5. The order of redundancy may be denoted as $(m, n)$ where $m$ is the number of redundancy levels and $n$ is the number of voting levels.

Referring to FIGURE 5, the equivalent single channel system consists of a cascade of a number, $b$, of functional blocks in the order $g_{11}$, $g_{12}$, $g_{13}$, etc., up to $g_{1b}$. Now if the system is broken up into a number of subsystems, where this number of subsystems is equal to $n$, and if further the number of blocks in each subsystem is equal to $a$, then the number of blocks in each subsystem, $a$, is equal to $b/n$.

The blocks in the first subsystem can be designated $g_{11}$, $g_{12}$, etc., up to $g_{1a}$ and this series of functional blocks is represented by the dotted lines between the functional blocks $g_{11}$ and $g_{1a}$.

The last series of functional blocks in this channel would be $g_{1(b-a+1)}$, $g_{1(b-a+2)}$, etc., up to $g_{1b}$ and this series of functional blocks is represented by the dotted lines between the functional blocks $g_{1(b-a+1)}$ and $g_{1b}$.

In making the system redundant, a voter $V_1$ up through $V_n$ is used at the output of each subsystem so that for $n$ subsystems there will be $n$ number of voters and each subsystem may be referred to as a voting block or voting level.

In general, there will be $n$ such subsystems in each channel and this is indicated in FIGURE 5 by the dotted lines between the voter $V_1$ and the input junction to the last subsystem.

For majority logic redundancy, there are an odd number of channels and in FIGURE 5 there is shown $m$ such redundant channels. The first subscript in each functional block represents the number of each channel. Thus, for example, the first functional block in each channel is designated $g_{11}$, $g_{21}$, etc., up to $g_{m1}$ for $m$ number of channels and this sequence of functional blocks is represented in FIGURE 5 by the dotted lines between the blocks $g_{21}$ and $g_{m1}$.

It is established then that in FIGURE 5 there are $a$ number of functional elements per voting block; there are $b$ number of functional elements per equivalent single channel system; there are $m$ number of redundant channels; and $n$ number of voting blocks where $a$ is equal to $b/n$.

If it is assumed for comparison purposes that each functional block has an equal probability of survival, $p_s$, in a given period of time and further if the voters are perfect elements, not subject to failure, then according to well known probability theory, the probability of survival of a number $a$ of such cascaded elements or functional blocks will be $p_s$ raised to the power $a$. Since $a=b/n$ this probability is also given by $p_s$ raised to the $b/n$ power.

The survival probability of the entire system of $m$ redundant channels and $n$ volting blocks is designated $P_s(m, n)$.

In order to find this probability, there is determined the number of ways in which failures may or may not occur so as to allow the redundant system to survive. Each of these conditions has a certain probability of occurrence and the probability of total system survival then is the sum of the survival probabilities for each condition.

Let $i$ represent the number of failure events. It has been established that $p_s$ raised to the $b/n$ is the survival probability of one channel in a voting block, then $(1-p_s^{b/n})$ is the failure probability of that same group of elements. This is so because the probability of failure or survival is always a certainty and equal to one.

The probability of exactly a number $i$ of such channel failures is given by $(1-p_s^{b/n})$ raised to the $i$ power where $i$ is the number of failure events.

If there are a number of $i$ channels that fail then the number of surviving channels is equal to $m-i$, since $m$ is the total number of channels. Then the probability that exactly $m-i$ number of channels survive is the probability of survival of a single channel (which is $p_s$ raised to the $b/n$ power) in turn raised to the $m-i$ power.

Now there must be considered all of the combinations of exactly the number $i$ channel failures that may occur. This may be designated as $$\binom{m}{m-i}$$

which is defined as the number of ways that $m$ channels may be grouped—if they are taken $m-i$ channels at a time, where $m-i$ is the total number of channels less the number of failed channels.

For $m$ redundant channels the maximum number of channel failures that the volting block can survive is given by $$i_{max.}\frac{m-1}{2}$$

because for $i$ greater than $$\frac{m-1}{2}$$

the number of surviving channels is no longer in the majority.

Based on the foregoing, the probability of a single voting block surviving exactly a number $i$ of channel failures is given by the product of $$\binom{m}{m-i}$$

multiplied by $(p_s^{b/n})$ raised to $m-i$ power multiplied by $(1-p_s^{b/n})$ raised to the power $i$.

Now if these products are summed for various numbers of failures such as $i=0, 1, 2$, etc., up to and including the value $$i=\frac{m-1}{2}$$

then the sum represents the probability of survival of a single voting block. Since all voting blocks are in cascade, the probability that the entire system comprised of $n$ voting blocks will survive is given by the foregoing summation raised to the $n$ power, where $n$ is the number of voting blocks or voting levels.

The foregoing is equivalent then to the statement that $$P_s(m,n)=\left[\sum_{i=0}^{\frac{m-1}{2}}\binom{m}{m-i}\left(p_s^{b/n}\right)^{m-i}\left(1-p_s^{b/n}\right)^{i}\right]^{n}$$

It can be seen then that for nonredundant systems having marginal inherent reliability, little or no reliability enhancement can be obtained by increasing $m$ only in an $(m, 1)$ array. The variable $n$, i.e., the number of voting blocks or voting levels is, however, a very powerful means for achieving useful reliability improvement.

Figure 6:
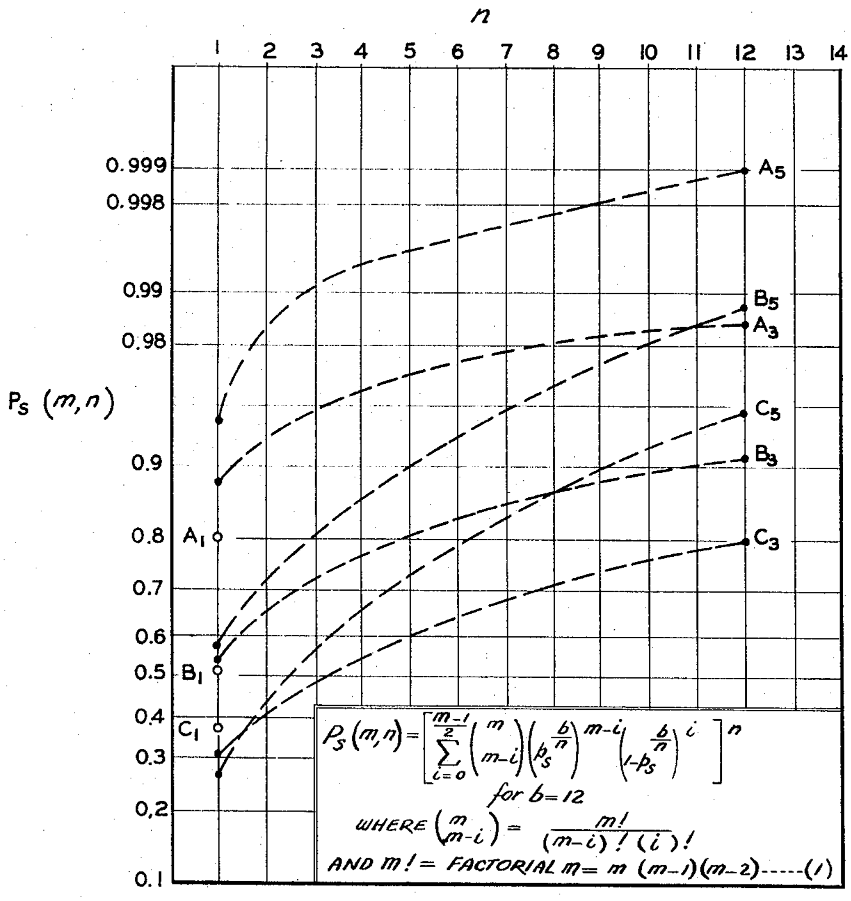
FIGURE 6 is a graphical illustration showing the survival probabilities for redundant arrays of the order $(m, n)$.

To illustrate the relative reliability improvement afforded by an $(m, n)$ array, the redundant system survival probability $P_s$ has been graphed in FIGURE 6 for several redundancy and voting levels. The basic system chosen for illustrating purposes is comprised of 12 functional elements, each having an assumed survival probability, $P_s$. Redundancy levels of 3 and 5 have been fixed as parameters with $n$ varying from 1 to 12, maintaining equal complexity in each voting level.

It will be seen from both the graphical illustration of FIGURE 6 and the expression of the provision $P_s(m, n)$ set forth in the aforedescribed equation that for nonredundant systems having marginal inherent reliability, little or no reliability enhancement can be obtained by increasing $m$ only in an $(m, 1)$ array. However, the variable $n$ is a very powerful means for achieving useful reliability improvement.

Implicit in the foregoing discussion was the assumption that the majority voter is a perfect element. Although the voter can be mechanized in rather simple form with relatively few components, as heretofore described, it does have a finite failure probability. Therefore, if the voter is replicated in each redundant channel, we may combine its failure probability $q_v$ with that of its associated functional element $q_f$. Since, in general, $q_f >> q_v$, the system survival probability will not be significantly decreased, and the system can survive a combined failure of any one functional element and its associated voter.

The replicated voter arrangement may be of a type such as the second form of the triple redundancy system described and claimed in a U.S. application Serial No. 317,970, filed October 22, 1963, by Harold Moreines and assigned to the The Bendix Corporation and in which system redundancy of the voter device may be provided so as to correct for the finite failure probability or possibility of imperfect operation of the voter device.

*Voter-monitor implementation*

To gain the advantages afforded by multiple-level voting in an analog system, it is clear that the majority element must be compatible with the various data forms commonly employed. It has been determined that the properties of conventional digital logic gates can be used to accomplish analog voting by an amplitude-selective process.

If we consider an $(m, 1)$ array, the system can survive a sequence of $$\frac{m-1}{2}$$

failures at which point the surviving channels constitute a simple majority of $$\frac{m+1}{2}$$

For any number of failures up to and including $$\frac{m-1}{2}$$

if we arrange all of the $m$ signal amplitudes in ascending order from the most negative to the most positive, it can be shown that the median amplitude will always fall within the surviving majority group regardless of the amplitudes of the failed signals. Then, if we always choose the median signal from among the $m$ signals available, we are assured of undegraded system operation for up to $$\frac{m-1}{2}$$

failures.

In the case of a triple redundant system, the selected signal is simply that which is intermediate in amplitude. To implement the signal selection function, a combination of diode "AND" and "OR" gates is used, arranged to select the intermediate amplitude from among three input signals. In total, this configuration is referred to as an Intermediate-Amplitude Selective Gate (IASG), or voter device, shown in FIGURES 3, 7, and 8.

Associated with each voting level is a set of monitor circuits for failure detection, storage and display. These are necessary to store failure events and to determine at any time whether at least a simple majority of the original $m$ redundant channels survive. If exactly $$\frac{m-1}{2}$$

failures have occurred, a "Warning" light may indicate this condition. The next failure occurrence may be indicated to the pilot by illuminating a "Failure" light.

Figure 9:
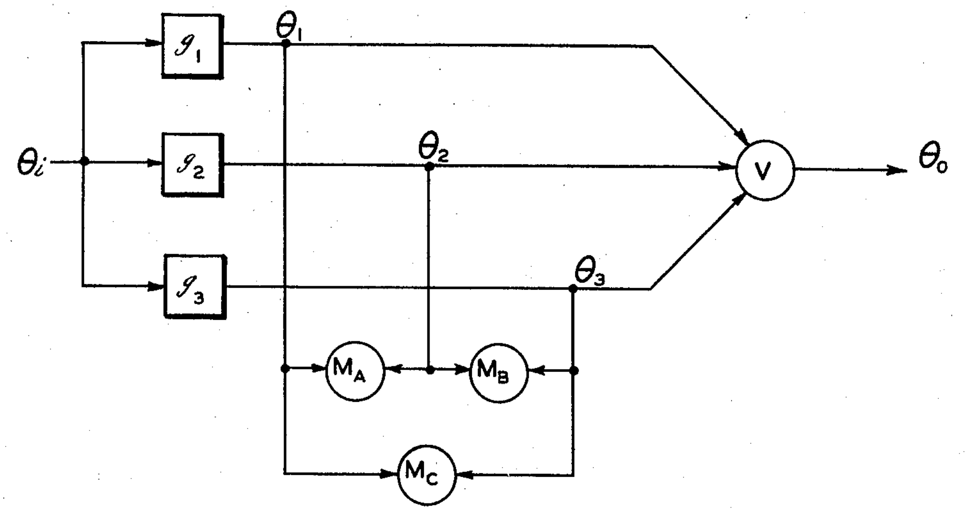
FIGURE 9 is a block diagram of a cross-channel monitoring system including a voter device V embodying the invention.

There are two ways in which the monitored data points may be chosen. FIGURE 9 illustrates a "cross-channel" monitoring system in which, for a triplicated system, the three signals are compared differentially, two-by-two. The System may include a voter device V embodying the present invention, and for the general $m$-level system, $m$ comparators are required. The "cross channel" monitoring system is disclosed and claimed in a U.S. application Serial No. 318,050, filed October 22, 1963, by Robert L. Worthington and Frank J. Thomas, and assigned to The Bendix Corporation, assignee of the present invention.

Figure 10:
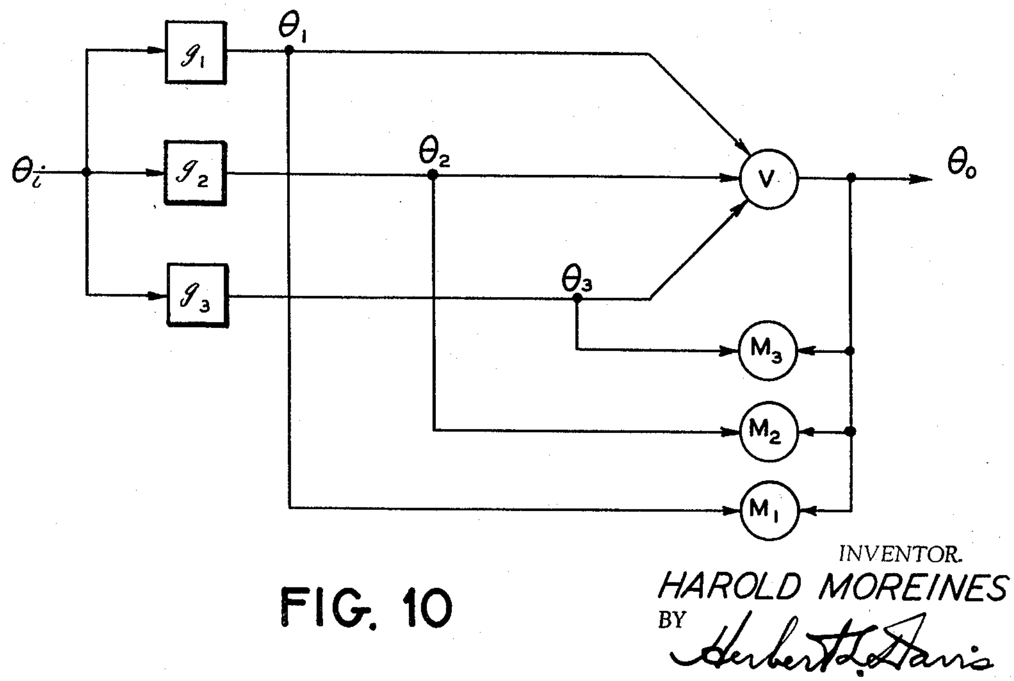
FIGURE 10 is a block diagram of a cross-voter monitoring system including a voter device V embodying the invention.

A second or "cross-voter," monitoring system is illustrated, again for a triplicated system, in FIGURE 10. Here, each input $\theta_i$, is compared differentially with the output $\theta_o$ from a voter device V embodying the invention. Where $m$ redundant voters are used, each input can be associated with a particular voter output for comparison purposes. The "cross-voter," monitoring system is disclosed and claimed in the U.S. application Serial No. 317,970, filed October 22, 1963, by Harold Moreines, and assigned to The Bendix Corporation.

In selecting one of the two methods, several factors warrant consideration. Cross-channel monitoring provides redundant failure data, since two comparators register each failure. Thus, in the event of a single passive monitor failure, the monitor retains its capability to indicate a subsequent system failure. The cross-voter monitor must be made internally redundant to provide this feature. Cross-channel monitoring also requires fewer leads between the monitored points and the monitor circuits. In a redundant-voter $(m, n)$ configuration, the cross-channel approach would yield a reduction in the number of monitor leads equal to $m \times n$.

However, the cross-voter monitor does offer an advantage in the degree of immunity to nuisance disconnects. During normal operation the tolerance spread in the monitored differential voltage is narrower in this configuration since we are comparing each input against a median voter output.

*Effects of failures on system operation*

A major objective in achieving a fail-operative system is to maintain absolute independence of failure events among the $m$ redundant channels, that is, no single causative shall result in simultaneous failure in more than one channel. To this end, separate power supplies are provided for each redundant channel. The voter circuit, too, provides isolation between functional elements in different channels, so that even direct short circuits are not reflected into other channels.

The use of $(m, n)$ redundancy as depicted in FIGURE 5 provides a significant reliability improvement over the $(m, 1)$ array shown in FIGURE 4. The former configuration permits any number (up to $n$) of concurrent dissimilar failures with no degradation in system performance.

Referring to FIGURE 5, consider a failure occurrence in function $g_{11}$. Voter $V_1$ prevents failure propagation into the next voting level. Then function $g_{2b}$ may fail without propagation beyond voter $V_n$. The two concurrent failures will not affect system performance.

However, consider the effect of the same failures in the $(m, 1)$ array of FIGURE 4. Now the maximum number of permissible failures, $$\frac{m-1}{2}$$

has been exceeded, and the entire system must be considered to have failed.

Triple redundancy in a (3, 3) array was applied to a typical single-axis stability augmentation axis of a manned aircraft. The estimated probability of failure for a 10 hour mission was decreased by a factor of 400 as compared with that of the original nonredundant system.

A by-product advantage of the majority voter concept is the improvement in system performance tolerance spreads by virtue of the intermediate-amplitude selection process.

While several embodiments of the invention have been illustrated and described, various changes in the form and relative arrangements of the parts which will now appear to those skilled in the art may be made without departing from the scope of the invention. Reference, therefore, is to be had to the appended claims for a definition of the limits of the invention.

What is claimed is:

1. In a system including a plurality of redundant subsystems, a first voter device for selecting from among several signals from one of said redundant subsystems an intermediate amplitude output signal, means for applying said intermediate amplitude output signal from said first voter device to inputs of another of said redundant subsystems, and a second voter device for selecting from among several signals from said other redundant subsystem an intermediate amplitude output signal.

2. The combination defined by claim 1 in which each of said voter devices comprises several first gate means corresponding in number to said several signals, each of said first gate means for selecting and providing as a first output signal the greater in one sense of two of said several signals applied thereto, in combination with a second gate means, said second gate means for selecting from the first output signals and providing as a second output signal the greater in an opposite sense of the first output signals so as to provide said second output signal of an amplitude intermediate said several signals.

3. The combination defined by claim 1 in which each of said voter devices comprises a selective gate for selecting a signal of intermediate amplitude from among said several signals, said selective gate comprising several primary gate means corresponding in number to said several signals, each of said primary gate means including a pair of diodes and a current limiting resistor connected to a source of voltage in one sense, the pair of diodes of each of said primary gate means having inputs connected respectively to a different pair of each of said several signals, the pair of diodes and current limiting resistor of each of said primary gate means being so arranged that said several primary gate means provide as secondary output signals, respectively, the greater in one sense of each of said different pairs of several electrical signals, a secondary gate means including a plurality of diodes and a current limiting resistor connected across the source of voltage in an opposite sense from the current limiting resistor of the primary gate means and so arranged that the diodes of the secondary gate means act on said secondary output signals in an opposite sense from the diodes of the said primary gate means so as to provide as a main output signal from the diodes of the secondary gate means the greater in an opposite sense of said secondary output signals applied to the diodes of said secondary gate means and thereby a main output signal of said intermediate amplitude.

4. The combination comprising a plurality of redundant subsystems, each of said subsystems for supplying several sinusoidal alternating current signals at an output thereof, a plurality of voter devices, each of said subsystems at the output thereof including at least one of said voter devices for selecting from among the several sinusoidal alternating current output signals of the corresponding redundant subsystems as intermediate amplitude sinusoidal alternating current output signal, means for serially connecting the output of one of said redundant subsystems to an input of another of said subsystems through such one voter device so that at least one of said voter devices serves to connect an intermediate amplitude sinusoidal alternating current output signal from a preceding redundant subsystem to said inputs of a succeeding redundant subsystem, and the last of said succeeding redundant subsystems including at least one of another of said plurality of voter devices for providing an intermediate amplitude sinusoidal alternating current output signal.

5. The combination comprising a pair of triple redundant subsystems, each of said triple redundant subsystems having triple outputs supplying several sinusoidal alternating current signals of varying polarity at the outputs thereof, a first voter device including a selective gate for selecting a sinusoidal signal of varying polarity and intermediate amplitude from among the several sinusoidal alternating current signals at the triple outputs of one of said triple redundant subsystems, said selective gate including several primary gate means corresponding in number to said several sinusoidal alternating current signals at the triple outputs of said one triple redundant subsystem, each of said primary gate means including a pair of diodes and a current limiting resistor connected to a first source of voltage having one polarity sense, the pair of diodes of each of said primary gate means having inputs connected respectively to a different pair of each of said several signals from the triple outputs of said one triple redundant subsystem, the pair of diodes and current limiting resistor of each of said primary gate means being so arranged that said several primary gate means provide as secondary output signals, respectively, the greater in another polarity sense of each of said different pairs of varying polarity sinusoidal electrical signals, the selective gate of said first voter device including a secondary gate means, each of said secondary gate means including a plurality of diodes and a current limiting resistor connected across the first source of voltage in an opposite polarity sense from the current limiting resistor of the primary gate means and so arranged that the diodes of the secondary gate means act on said secondary output signals in opposite polarity sense from the diodes of said primary gate means so as to provide as a main output signal from the diodes of the secondary gate means the greater in an opposite polarity sense of said varying polarity sinusoidal secondary output signals applied to the diodes of said secondary gate means, and thereby provide a main sinusoidal output signal of said intermediate amplitude, means for applying said main sinusoidal output signal of said intermediate amplitude from said first voter device to triple inputs of the other of said triple redundant subsystem, a second voter device including a selective gate for selecting a sinusoidal signal of varying polarity and intermediate amplitude from among the several sinusoidal alternating current signals at the triple outputs of the other of said pair of triple redundant subsystems, said selective gate of said second voter device including several primary gate means corresponding in number to said several sinusoidal alternating current signals at the triple outputs of said other triple redundant subsystem, each of said primary gate means including a pair of diodes and a current limiting resistor connected to a second source of voltage having one polarity sense, the pair of diodes of each of said primary gate means having inputs connected respectively to a different pair of each of said several signals from the triple outputs of said other triple redundant subsystem, the pair of diodes and current limiting resistor of each of said primary gate means being so arranged that said several primary gate means provide as secondary output signals, respectively, the greater in another polarity sense of each of said different pairs of varying polarity sinusoidal electrical signals, the selective gate of said second voter device including a secondary gate means, each of the secondary gate means of the second voter device including a plurality of diodes and a current limiting resistor connected across the second source of voltage in an opposite polarity sense from the current limiting resistor of the primary gate means of said second voter device and so arranged that the diodes of the secondary gate means of the second voter device act on said last mentioned secondary output signals in an opposite polarity sense from the diodes of the said primary gate means of such secondary voter device so as to provide as a main output signal from the diodes of the secondary gate means of the second voter device the greater in an opposite polarity sense of said varying polarity sinusoidal secondary output signals applied to the diodes of said secondary gate means of the second voter device, and thereby provide a main sinusoidal output signal of said intermediate amplitude at the output of said second voter device.

References Cited by the Examiner

UNITED STATES PATENTS

| | | | |
|---|---|---|---|
| 2,670,445 | 2/1954 | Felker | 307—88.5 |
| 3,069,562 | 12/1962 | Steele | 307—88.5 |

ARTHUR GAUSS, *Primary Examiner.*

J. BUSCH, *Assistant Examiner.*